(12) United States Patent
Pautis et al.

(10) Patent No.: US 11,753,177 B2
(45) Date of Patent: Sep. 12, 2023

(54) ASSEMBLY FOR AN AIRCRAFT, THE ASSEMBLY COMPRISING A MAST AND A WING

(71) Applicant: Airbus Operations SAS, Toulouse (FR)

(72) Inventors: Olivier Pautis, Toulouse (FR); Michael Berjot, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 65 days.

(21) Appl. No.: 17/621,467

(22) PCT Filed: Jun. 9, 2020

(86) PCT No.: PCT/EP2020/065963
§ 371 (c)(1),
(2) Date: Dec. 21, 2021

(87) PCT Pub. No.: WO2020/260010
PCT Pub. Date: Dec. 30, 2020

(65) Prior Publication Data
US 2022/0411085 A1 Dec. 29, 2022

(30) Foreign Application Priority Data
Jun. 26, 2019 (FR) .................................. 1906923

(51) Int. Cl.
*B64D 27/26* (2006.01)
*B64C 3/18* (2006.01)
(52) U.S. Cl.
CPC .............. *B64D 27/26* (2013.01); *B64C 3/185* (2013.01); *B64D 2027/262* (2013.01)

(58) Field of Classification Search
CPC ...... B64D 27/26; B64D 2027/262; B64C 3/32
See application file for complete search history.

(56) References Cited

U.S. PATENT DOCUMENTS

2019/0176961 A1* 6/2019 Tulloch ................ F16B 37/145
2020/0148378 A1 5/2020 Pautis et al.

FOREIGN PATENT DOCUMENTS

EP 3498609 A1 6/2019
WO 2018192787 A1 10/2018

OTHER PUBLICATIONS

International Search Report; priority document.

* cited by examiner

*Primary Examiner* — Timothy D Collins
*Assistant Examiner* — Eric Acosta
(74) *Attorney, Agent, or Firm* — Greer, Burns & Crain, Ltd.

(57) ABSTRACT

An assembly having a pylon with an upper spar and two lateral scoops, a wing with a skin and a front spar, portside/starboard-side front/rear brackets, each with a recess for a nut. The front spar has front/intermediate/rear pleats. Each front bracket is positioned against the front pleat and the intermediate pleat. Each rear bracket is positioned against the intermediate pleat and the skin. For each recess, the associated bracket has an open bore passing through it that opens into the recess. For each recess, the assembly has a fastening bolt having the nut and a screw of which the threaded shank passes through coaxial bores in the front pleat, in the skin, in the upper spar and in the associated lateral scoop, and the open bore, and is screwed into the nut, and of which the head bears against the lateral scoop.

5 Claims, 3 Drawing Sheets

ASSEMBLY FOR AN AIRCRAFT, THE ASSEMBLY COMPRISING A MAST AND A WING

CROSS-REFERENCES TO RELATED APPLICATIONS

This application claims the benefit of the International Application No. PCT/EP2020/065963, filed on Jun. 9, 2020, and of the French patent application No. 1906923 filed on Jun. 26, 2019, the entire disclosures of which are incorporated herein by way of reference.

FIELD OF THE INVENTION

The present invention relates to an assembly for an aircraft, the assembly having a pylon and a wing, and to an aircraft having at least one such assembly.

BACKGROUND OF THE INVENTION

An aircraft conventionally has a fuselage and, on each side of the latter, an assembly that is made up of a wing and a pylon fastened beneath the wing so as to attach a jet engine thereto.

FIG. 5 shows a view from above of an assembly 500 of the prior art, for example as described in the document EP3498609, and FIG. 6 shows a side view in cross section along the line VI-VI in FIG. 5.

In FIG. 5, the wing 504 is represented by the outline of its front spar 506 that extends along the leading edge of the wing 504.

The pylon 502, in particular, has an upper spar 508 and lateral scoops 510 that are fastened against lateral panels 512 beneath the upper spar 508.

The wing 504 has a skin 514 that forms the aerodynamic surface of the wing 504 and the front spar 506 extends along the leading edge of the wing 504 on the inside of the skin 514.

In the embodiment presented here, the assembly 500 also has an interposed part 516 that is positioned between the skin 514 and the upper spar 508.

The wing 504, in this case, also has a bracket 518 that is positioned in front of the front spar 506.

The assembly 500 also has a plurality of fastening bolts 520 that sandwich the bracket 518, the front spar 506, the upper spar 508 and a lateral scoop 510 in order to fasten the pylon 502 to the wing 504.

Although such an assembly is satisfactory from the point of view of operation, the fastening bolts 520 are all positioned in a cantilevered manner at the front of the front spar 506, and this generates a significant torsional moment in the front spar 506, and it is then necessary to add reaction fittings at the front and at the rear so as to compensate for this torsional moment, with consequences in terms of weight and cost.

Furthermore, the fastenings that are furthest forward create a significant lever arm with the front spar 506. These torsional moments are further increased in the event of a rear fastening bolt breaking, and the diameter of the fastening bolts then has to be increased to compensate. It is, therefore, necessary to find a particular arrangement that makes it possible to limit the torsional moment and, therefore, the weight that is added so as to mechanically reinforce the elements of the assembly.

SUMMARY OF THE INVENTION

An object of the present invention is to propose an assembly for an aircraft, which has a wing and a pylon fastened to the wing and of which the structure makes it possible to limit the torsional moment at the front spar of the wing.

To that end, there is proposed an assembly for an aircraft, which makes it possible to distribute the fastening bolts on either side of the front spar and therefore to eliminate the torsional moment in the front spar.

BRIEF DESCRIPTION OF THE DRAWINGS

The above-mentioned features of the invention, along with others, will become more clearly apparent upon reading the following description of an exemplary embodiment, the description being given with reference to the appended drawings, in which:

With reference to FIG. 1, an aircraft 100 has a fuselage 102, to each side of which is fastened a wing 104 that bears at least one jet engine 150, in particular, a turbofan.

DETAILED DESCRIPTION OF THE PREFERRED EMBODIMENTS

The jet engine 150 is fastened beneath the wing 104 by way of a pylon 106.

In the following description, and by convention, the X direction is the longitudinal direction of the jet engine 150, oriented positively towards the front of the aircraft 100, the Y direction is the transverse direction, which is horizontal when the aircraft is on the ground, and the Z direction is the vertical direction, these three directions X, Y and Z being mutually orthogonal.

Figure 1:
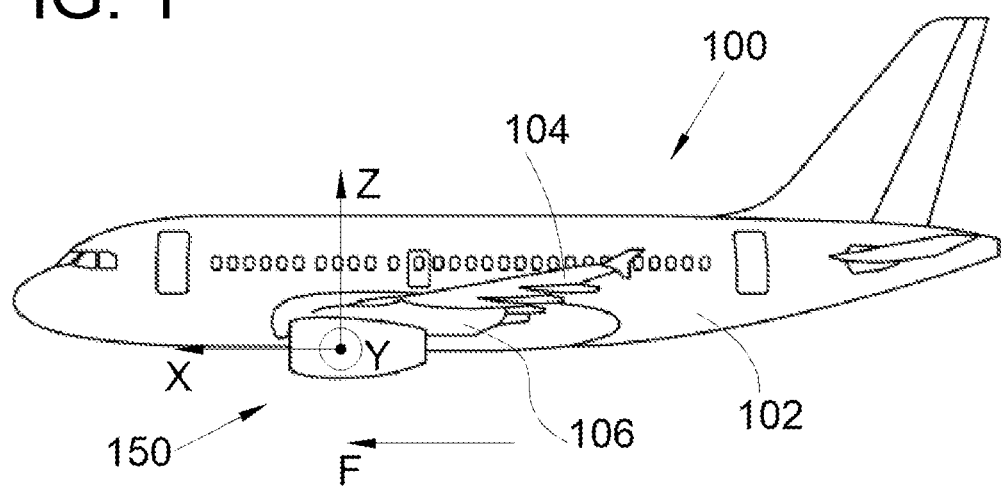
FIG. 1 is a side view of an aircraft having an assembly according to the invention.

Moreover, the terms "front" and "rear" are to be considered relative to a direction of forward movement of the aircraft 100 when the jet engine 150 is in operation, this direction being schematically shown by the arrow F in FIG. 1.

Figure 2:
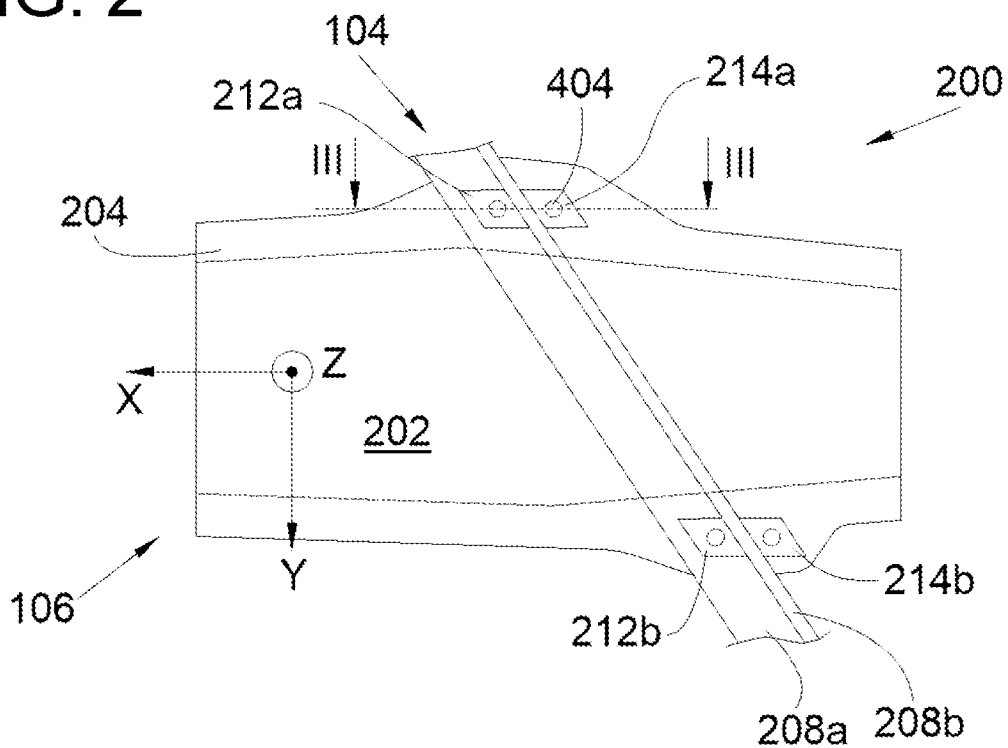
FIG. 2 is a view from above of an assembly according to the invention.
Figure 3:
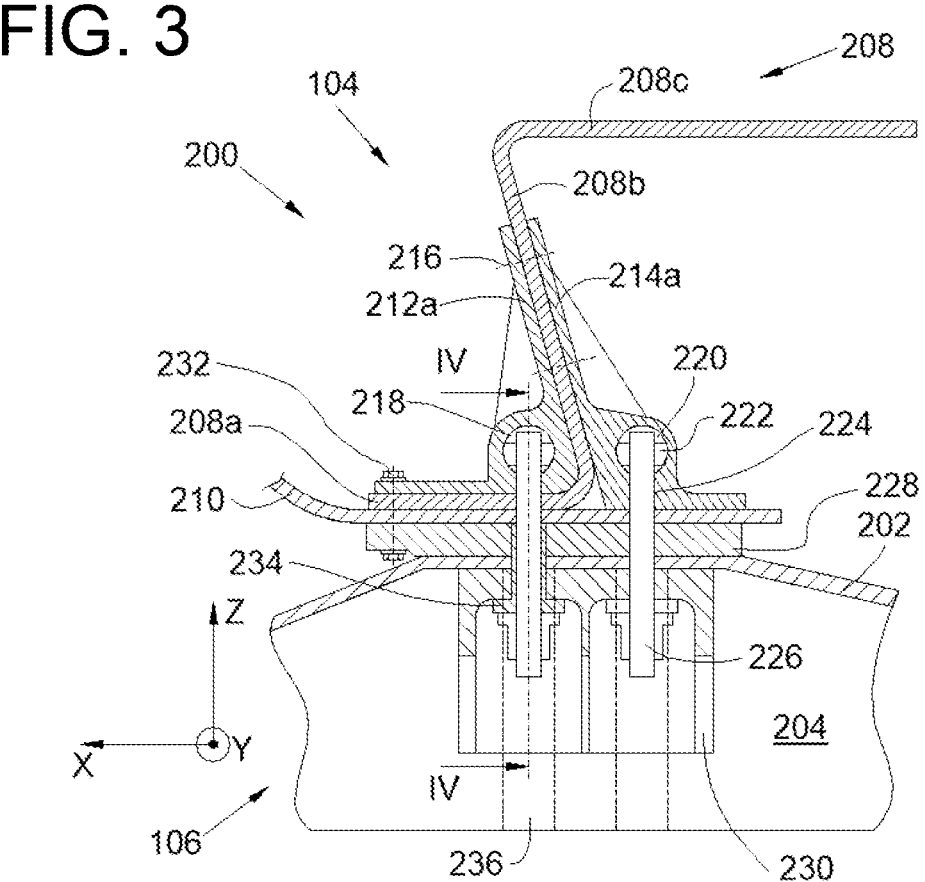
FIG. 3 is a side view in cross section along the line III-III in FIG. 2.

FIG. 2 shows an assembly 200 according to the invention in a view from above, and FIG. 3 shows the assembly 200 in cross section.

Figure 4:
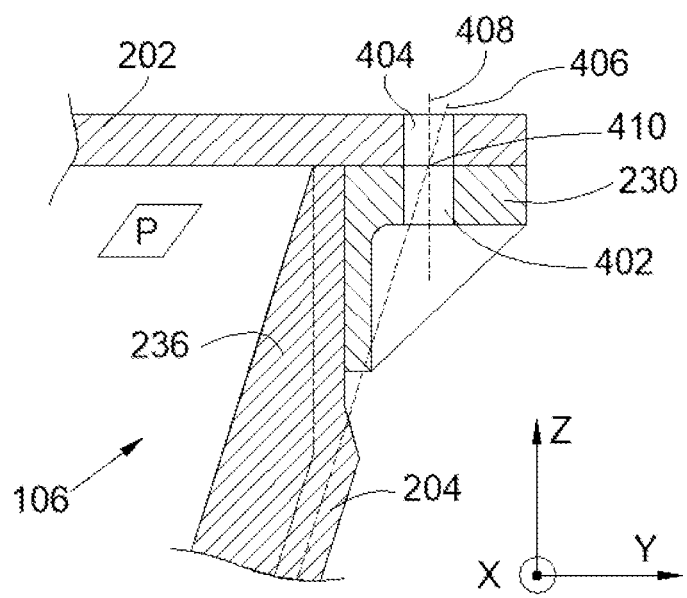
FIG. 4 is a view in cross section along the line IV-IV in FIG. 3.
Figure 5:
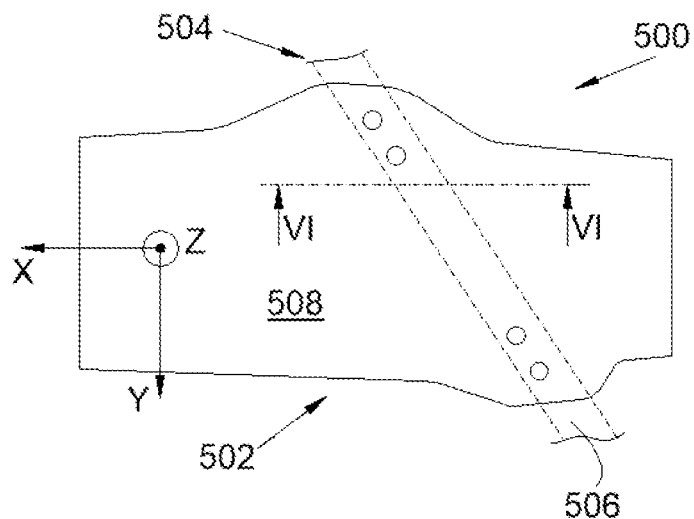
FIG. 5 is a view from above of an assembly of the prior art.
Figure 6:
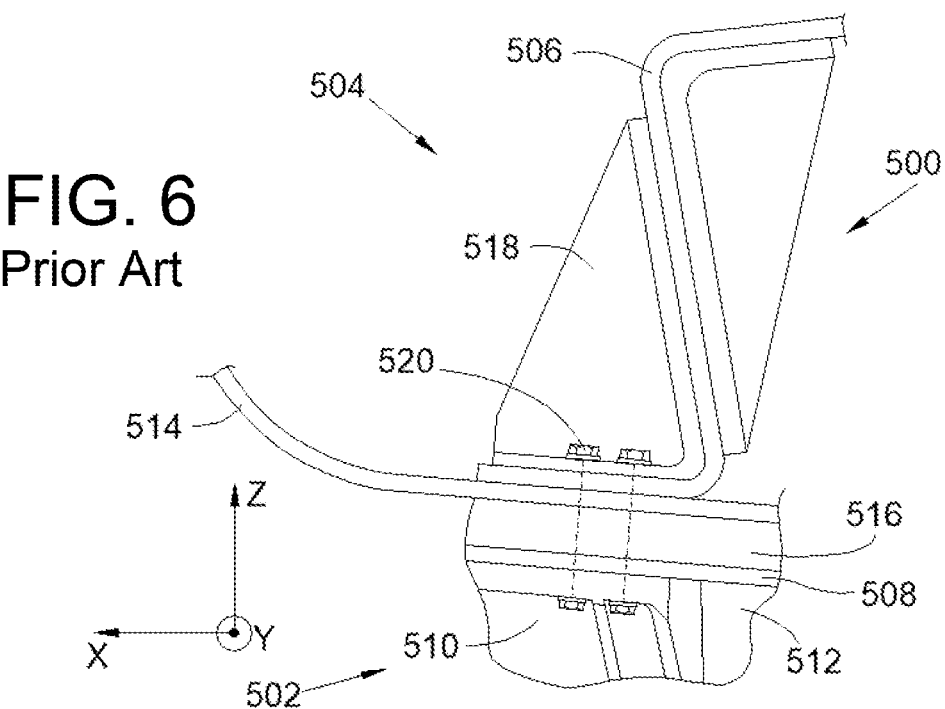
FIG. 6 is a side view in cross section along the line VI-VI in FIG. 5.

The assembly 200 has the pylon 106 that has an upper spar 202, a port-side lateral panel 204 and a starboard-side lateral panel 204 that are seen in dashed line in FIG. 2 since they are beneath the upper spar 202. The lateral panels 204 extend generally vertically on either side of the upper spar 202. FIG. 4 shows a cross section of a lateral panel 204 and of the upper spar 202. Each lateral scoop 230 has a surface for contact with the upper spar 202.

The assembly 200 also has the wing 104 that has a skin 210 that forms the aerodynamic surface of the wing 104 and a front spar 208 that extends along the leading edge of the wing 104 on the inside of the skin 210.

The front spar 208 has a front pleat 208a, an intermediate pleat 208b and a rear pleat 208c and, in this case, has a Z-shaped profile.

The intermediate pleat 208b extends between a lower edge and an upper edge that is above the lower edge and in this case in a generally vertical plane.

The front pleat 208a has a proximal end that is as one with the lower edge of the intermediate pleat 208b and a distal end that extends forwards relative to the proximal end of the front pleat 208a.

The rear pleat 208c has a proximal end that is as one with the upper edge of the intermediate pleat 208b and a distal end that extends rearwards relative to the proximal end of the rear pleat 208c.

FIG. 2 shows the positioning of the front spar 208 relative to the upper spar 202 without the skin 210.

The pylon 106, and more particularly the upper spar 202, is positioned against the skin 210. In the embodiment of the invention that is presented in FIG. 3, the wing 104 has an interposed part 228 that is positioned between the skin 210 and the upper spar 202, in order to have a plane-plane interface with the upper spar 202.

The pylon 106, in this case, also has two lateral scoops 230, each one being fastened on the outside against a lateral panel 204 beneath the upper spar 202 for example by way of bolts.

The wing 104 has a starboard-side front bracket 212a and a port-side front bracket 212b, and each one is positioned in front of the intermediate pleat 208b against the front pleat 208a and the intermediate pleat 208b.

The wing also has a starboard-side rear bracket 214a and a port-side rear bracket 214b, and each one is positioned behind the intermediate pleat 208b against the intermediate pleat 208b and the skin 210.

Each front bracket 212a-b is positioned alongside a rear bracket 214a-b, on either side of the intermediate pleat 208b, and thus sandwich the intermediate pleat 208b. Each bracket 212a-b, 214a-b is fastened to the intermediate pleat 208b, for example by means of clamping screws 216.

The front pleat 208a, the skin 210 and the interposed part 228 are sandwiched between the upper spar 202 and the front brackets 212a-b. The skin 210 and the interposed part 228 are sandwiched between the upper spar 202 and the rear brackets 214a-b.

Each front bracket 212a-b has a front recess 218 and each rear bracket 214a-b has a rear recess 220.

Each recess 218, 220 is positioned vertically relative to one of the scoops 230.

Each front recess 218 and rear recess 220 allows a nut 222 to be put in place, and each bracket 212, 214 has an open bore 224 passing through it that opens into the recess 218, 220 and extends towards the pylon 106, in this case each open bore 224 extends vertically.

For each front recess 218, each one of the front pleat 208a, the skin 210, the interposed part 228, the upper spar 202 and the associated lateral scoop 230 has a bore passing through it that is coaxial with the open bore 224 corresponding to the front recess 218.

For each rear recess 220, each one of the skin 210, the interposed part 228, the upper spar 202 and the associated lateral scoop 230 has a bore passing through it that is coaxial with the open bore 224 corresponding to the rear recess 220.

This alignment of the bores that are coaxial with the open bore 224 allows a screw 226 to be put in place that has a head and a threaded shank, of which the threaded shank passes successively through the bore 402 in the lateral scoop 230, the bore 404 in the upper spar 202, the bore in the interposed part 228, the bore in the skin 210 and the open bore 224 so as to be screwed into the nut 222, while the head bears against the lateral scoop 230. Each screw 226 and the associated nut 222 form a fastening bolt.

In the embodiment of the invention, there are therefore two fastening bolts 222, 226 in front of the intermediate pleat 208b and two fastening bolts 222, 226 behind the intermediate pleat 208b, and this distribution makes it possible to eliminate the torsional moment in the front spar 208 of the wing 104.

Furthermore, the distribution of the fastening bolts 222, 226, one behind the other with respect to the longitudinal direction X, allows easier access for tightening and loosening via the outside of the pylon 106 without it being necessary to access the inside of the skin 210 or of the pylon 106.

Furthermore, in the event of one of the fastening bolts breaking, the maximum distance between two end bolts remains identical, and the diameter of the fastening bolts can be reduced relative to the diameter of the fastening bolts of the prior art.

The interposed part 228 is fastened to the skin 210, to the front pleat 208a and to each front bracket 212a-b by putting in place clamping bolts 232, only one of which is shown in FIG. 3. Each clamping bolt 232 passes through a bore that passes through the skin 210, the front pleat 208a and each front bracket 212a-b. Other fastening means can be provided at the rear of the interposed part 228.

At each front bracket 212a-b, the assembly 200 is equipped with a shear pin 234 that takes the form of a cylinder in which is fitted the threaded shank of the fastening bolt corresponding to the front bracket 212a-b and that extends through the bore 402 in the lateral scoop 230 and the bore in the interposed part 228 by passing through the bore 404 in the upper spar 202. These shear pins 234 transmit the loads from the pylon 106 to the interposed part 228 and these loads are then transmitted to the wing 104 via the clamping bolts 232.

FIG. 4 shows a cross section at a mid-plane of a stiffener 236 of the lateral panel 204. The stiffener 236 and the lateral panel 204 form a single part, thus constituting a self-stiffened integrated panel.

The stiffeners 236 are inside the pylon 106 and are seen in dashed line in FIG. 3, and the inner face of the lateral panel 204 is seen in dashed line in FIG. 4. The description that is given below relates to the fastening bolt corresponding to the port-side front bracket 212b, but it is also valid for the fastening bolt corresponding to the starboard-side front bracket 212a and each rear bracket 214a-b. Of course, the lateral panel 204 can have other stiffeners distributed over its length.

The mid-plane of the stiffener 236 is embodied by the plane P in FIG. 4, which in this case corresponds to the plane of the sheet.

The mid-plane of the lateral panel 204 is the plane that passes through the straight line 406 and is perpendicular to the plane of the sheet.

The axis of the open bore 224, and therefore of the fastening bolt, is embodied by the line referenced 408 in FIG. 4.

The intersection between the mid-plane P of the stiffener 236 and the mid-plane of the lateral panel 204 is the straight line 406.

The surface for contact between the upper spar 202 and the lateral scoop 230 intersects the axis 408 of the open bore 224 at a point of intersection 410 and this point of intersection 410 belongs to the straight line 406.

Such an installation makes it possible to eliminate the torsional moment in the lateral panel 204 by aligning the fastening bolts and the mid-plane P of the stiffener 236 and the mid-plane of the lateral panel 204.

Thus, in a general manner, for each open bore 224 in a starboard-side bracket 212a, 214a, the starboard-side lateral panel 204 has a stiffener 236 and, for each open bore 224 in a port-side bracket 212b, 214b, the port-side lateral panel 204 has a stiffener 236. Each lateral panel 204 has a mid-plane, and each stiffener 236 has a mid-plane P. The intersection between the mid-plane of each lateral panel 204 and the mid-plane P of each associated stiffener 236 is the straight line 406 and the surface for contact between the upper spar 202 and the lateral scoop 230 intersects the axis 408 of each open bore 224 at a point of intersection 410, wherein the point of intersection 410 belongs to the straight line 406 corresponding to the open bore 224.

In the embodiment of the invention that is presented in FIGS. 3 and 4, the lateral scoops 230 are elements that are supplementary to the lateral panels 204, but they could be an integral part of the lateral panels 204.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly comprising:
 a pylon comprising
  an upper spar,
  a starboard-side lateral panel and a port-side lateral panel that extend vertically on either side of the upper spar, and
  two lateral scoops, each scoop being fastened on an outside against a lateral panel and having a surface for contact with the upper spar,
 a wing comprising
  a skin,
  a front spar extending on an inside of the skin,
  a starboard-side front bracket,
  a port-side front bracket,
  wherein each front bracket has a front recess,
  wherein, for each front recess, an associated front bracket has an open bore passing through the front bracket that opens into said recess,
  wherein the front spar has a front pleat, an intermediate pleat and a rear pleat,
  wherein the front pleat has a proximal end as one with a lower edge of the intermediate pleat and a distal end that extends forwards relative to the proximal end, and
  wherein the rear pleat has a proximal end as one with an upper edge of the intermediate pleat and a distal end that extends rearwards relative to the proximal end,
  wherein each front bracket is positioned in front of the intermediate pleat against the front pleat and the intermediate pleat, and
  wherein each front bracket is fastened to said intermediate pleat,
  wherein, for each front recess, each one of the front pleat, the skin, the upper spar and an associated lateral scoop has a bore passing therethrough that is coaxial with the open bore corresponding to the front recess,
 wherein the wing also comprises a starboard-side rear bracket and a port-side rear bracket,
  wherein each rear bracket has a rear recess, and
  wherein each rear bracket is positioned behind the intermediate pleat against the intermediate pleat and the skin, and
  wherein each rear bracket is fastened to said intermediate pleat,
  wherein, for each rear recess, an associated rear bracket has an open bore passing therethrough that opens into said recess,
  wherein, for each rear recess, each one of the skin, the upper spar and an associated lateral scoop has a bore passing therethrough that is coaxial with the open bore corresponding to the rear recess, and
  wherein, for each of the front and rear recesses, the assembly also has a fastening bolt having a nut housed in said recess, and a screw, of which a threaded shank passes through the coaxial bores and the open bore, and is screwed into the nut, and of which the head bears against the associated lateral scoop.

2. The assembly according to claim 1,
 wherein the wing has an interposed part that is positioned between the skin and the upper spar, and
 wherein the interposed part is fastened to the skin, to the front pleat and to each front bracket by putting in place clamping bolts.

3. The assembly according to claim 2, wherein, at each front bracket, the assembly is equipped with a shear pin that is formed as a cylinder in which is fitted the threaded shank of the fastening bolt corresponding to said front bracket and that extends through a bore in the lateral scoop and a bore in the interposed part, by passing through a bore in the upper spar.

4. The assembly according to claim 1,
 wherein, for each open bore in a starboard-side bracket, the starboard-side lateral panel has a stiffener and, for each open bore in a port-side bracket, the port-side lateral panel has a stiffener,
 wherein each lateral panel has a mid-plane,
 wherein each stiffener has a mid-plane,
 wherein an intersection between the mid-plane of each lateral panel and the mid-plane of each associated stiffener is a straight line,
 wherein the surface for contact between the upper spar and the lateral scoop intersects an axis of each open bore at a point of intersection, and
 wherein each point of intersection belongs to the straight line corresponding to said open bore.

5. An aircraft having at least one assembly according to claim 1.

* * * * *